Aug. 24, 1965  R. E. LOOMANS  3,202,119
COVERING DEVICES FOR GRAIN DRILLS
Filed June 29, 1961  2 Sheets-Sheet 2
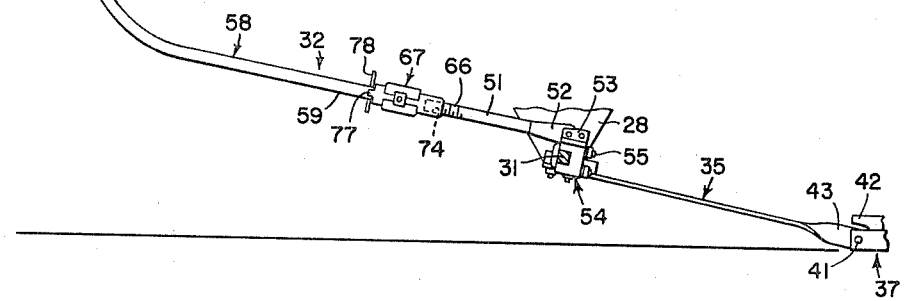
FIG. 3
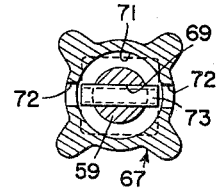
FIG. 4
FIG. 5
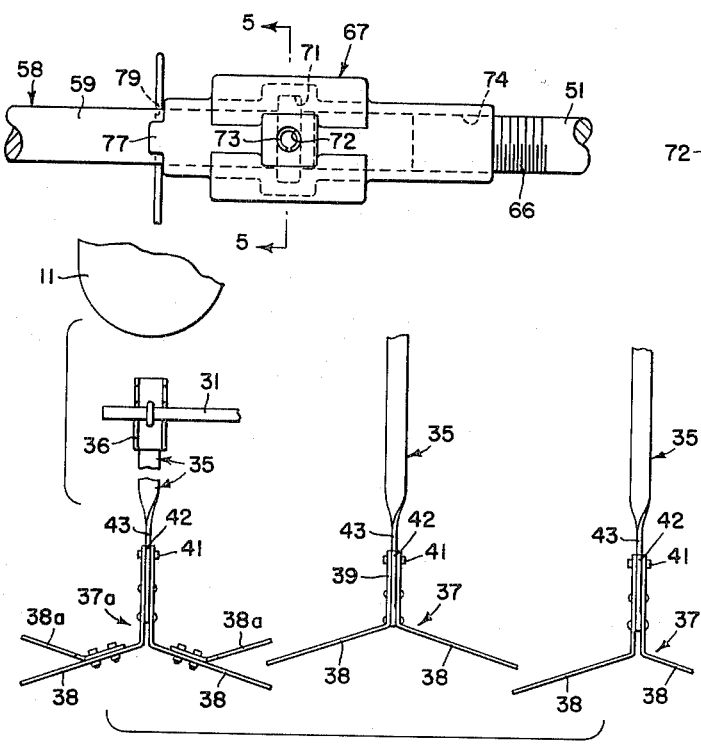
FIG. 6
INVENTOR.
ROBERT E. LOOMANS
BY
*Roger C. Johnson*
ATTORNEY United States Patent Office 3,202,119
Patented Aug. 24, 1965

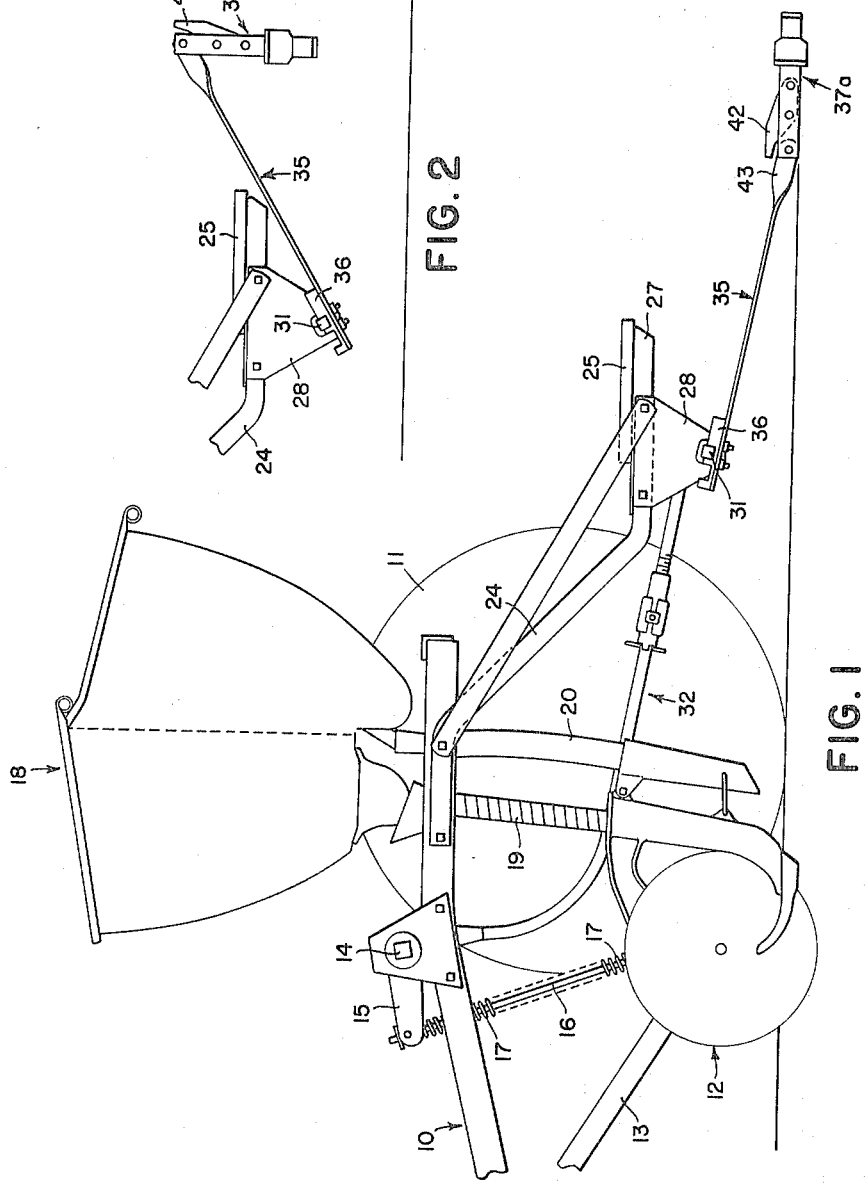

3,202,119
COVERING DEVICES FOR GRAIN DRILLS
Robert E. Loomans, Horicon, Wis., assignor to Deere & Company, Moline, Ill., a corporation of Delaware
Filed June 29, 1961, Ser. No. 120,638
5 Claims. (Cl. 111—85)

This invention relates generally to agricultural implements and more particularly to seeding implements, such as grain drills or the like having seed furrow openers, seed dispensing means, and means associated therewith for covering the seed and leveling the ground behind the seed furrow openers.

The object and general nature of this invention is the provision of ground leveling means disposed behind the seed furrow openers of a grain drill or the like and means for raising or lowering the ground leveling means concurrently with the raising and lowering of the furrow openers.

More specifically, it is a feature of this invention to provide a rockshaft on the frame of the implement operatively connected with the rockshaft that raises and lowers the grain drill furrow openers, with arms on the first-mentioned rockshaft carrying the leveling means into and out of ground leveling position. A further feature of this invention is the provision of resilient arms carrying the seed covering and ground leveling means, whereby downward pressure may be applied against the covering and leveling means for holding them to their work, particularly when going over rough ground. A still further feature of this invention is the provision of an adjustable connection between the two rockshafts whereby the amount of down pressure may be varied as desired, according to soil conditions.

An additional feature of this invention is the provision of coverers directly behind the wheels of the grain drill so constructed and arranged so as to pull in soil displaced by the wheels so as to cover and eliminate the wheel tracks, and another feature of this invention is the provision with Y-shaped coverers whereby trash and the like readily slides off the coverers.

These and other objects and advantages of this invention will be apparent to those skilled in the art after a consideration of the following detailed description, taken in conjunction with the accompanying drawings, in which:

FIG. 1 is a side view of a grain drill in which the principles of this invention have been incorporated, showing the grain drill and furrow openers in working position.

FIG. 2 is a fragmentary side view showing the coverers in their raised and folded position.

FIG. 3 is an enlarged side view, with certain parts in section, showing the adjustable link extending between the pressure shaft of the grain drill and the rockshaft supporting the coverer arms.

FIG. 4 is an enlarged fragmentary view of the barrel section of the coverer adjusting link.

FIG. 5 is a section taken along the line 5—5 of FIG. 4.

FIG. 6 is a plan view of the rear portions of certain of the coverers and, in addition, showing the wheel track leveling means.

Referring first to FIG. 1, the reference numeral 10 indicates the main frame of the grain drill, the same being suported on ground wheels 11. The grain drill includes a plurality of transversely aligned and laterally spaced apart seed furrow openers 12, each connected to the forward portion of the grain drill 10 by drag bar 13. Carried on the main frame 10 is a transverse rockshaft or pressure shaft 14 having arms 15 fixed thereto, the outer end of the arms 15 being connected to raise and lower the furrow openers 12 by lift rods 16 with which are associated a plurality of springs 17 by which downward pressure may be exerted against the seed furrow opener 12 when the shaft 14 is rocked in a counterclockwise direction (FIG. 1).

The frame 10 carries hopper means 18, and seed or fertilizer is carried into the furrows opened by the furrow openers 12 through seed and fertilizer tubes 19 and 20. The grain drill frame 10 also includes outwardly and rearwardly extending brackets 24 on which a transverse foot board 25 is supported. The footboard provides for easy and convenient access to the hoppers 18.

According to this invention there is provided a plurality of short angles 27 and associated plate members 28 having apertured lower portions to receive bearing means by which a rear transverse rockshaft 31 is supported from the footboard brackets 24. The two rockshafts 14 and 31 are adjustably connected together by connecting means indicated in its entirety by reference numeral 32, which will be described in detail below, whereby whenever the rockshaft 14 is rocked to raise or lower the furrow openers 11, the coverer rockshaft 31 is also swung in a direction to raise or lower the coverers.

Fixed by any suitable means, such as clamps 36 (FIG. 6), to the rear rockshafts 31 is a plurality of coverer arms 35, and pivoted to the rear of each arm 35 is a coverer blade means indicated in its entirety by the reference numeral 37. As best shown in FIG. 6 each land leveling or coverer unit 37 includes a pair of angled blade members 38 having forward fore-and-aft extending portions 39 fixed together in spaced apart relation by any suitable means, such as bolts, rivets or the like. The forward ends of the fore-and-aft extending portions 39 are apertured to receive pivots 41 by which a blade unit 37 is swingably connected with the apertured rear end portion of the associated coverer arm 35. Certain of the blade sections 39 are shorter than the others, as will be seen from FIG. 6, thereby providing for an overlapping arrangement of the lateral blade section 38 as illustrated in FIG. 6, whereby the coverers 37 afford substantially 100 percent coverage. The coverer arms 35 are so arranged on the rockshaft 31 that a coverer unit is disposed substantially directly rearwardly of each of the furrow opener units 12. Each land leveler or coverer unit 37 is pivoted to the associated land leveler arm 35 so as to be flexible in a generally vertical direction, whereby when the arms 35 are raised the units 37 will drop down (FIG. 2) and thus not be in the way of the person filling the hoppers who, in doing so, ordinarily steps up onto the footboard 25.

When the rockshaft 14 is actuated to raise the furrow openers 12, the rear rockshaft 31 is also rocked in a direction to raise the arms 35, thus lifting the swingable blade units 37 out of contact with the ground. The arms 35 are made of spring stock whereby when the pressure shaft 14 is rocked to lower the furrow openers against the spring arms 35 yieldingly hold the coverer units against the ground and prevent them from bobbing up and down when going over rough ground. In order to apply down pressure to the coverer or leveler units 37 when lowered, but accommodate downward swinging when raised, a stop bar 42 is fixed between the spaced apart blade portions 39 and contacts an abutment portion 43 on the associated land leveler arm 35, as will be seen from FIG. 1.

The adjustable connecting means 32 between the rockshafts 14 and 31 will now be described. This means includes a rear link section 51 having a flattened end 52 pivotally received between the two parts 53 of an arm 54 that is fixed to the rockshaft 31 by clamp means 55. It will be seen from FIG. 3 that the arm 54 extends generally upwardly from the rockshaft 31. Extending downwardly from the forward rockshaft 14 is an arm 56 that is fixed at its upper end to the rockshaft 14 by suitable clamp means 57. The forward link 58 of the connector 32 has a rear generally horizontally disposed portion 59 and a forwardly upwardly extending portion 61, the latter being pivoted, as at 62, to the lower end of the forward arm 56. The connector 32 also includes turnbuckle means that comprises a threaded section 66 on the forward end of the rear link section 51, and a turnbuckle barrel member 67 mounted on the rear portion 59 on the forward connecting link section 58. The rear portion of the link section 58 is provided with a roll pin receiving aperture 69 (FIG. 5), and the forward portion of the turnbuckle barrel member 67 is provided with an interior circumferentially extending means 71, access to which is had through a pair of diametrically oppositely arranged openings 72. When the forward portion of the barrel member 67 is disposed over the rear section 59 of the forward link member 58, a roll pin 73 is insertible through one of the openings 72 into the opening 69, the pin 73 being frictionally retained in the opening 69. The pin 73 engages the side walls of the means 71, and thus the turnbuckle member 67 is rotatably connected with the rear portion of the forward link member 58. The rear portion of the turnbuckle barrel 67 is threaded, as indicated at 74, and is thus adapted to be screwed onto the forward threaded section 66 of the rear link member 51.

Each of the laterally outermost coverer units 37a are disposed directly behind the associated ground wheel 11 and carry generally forwardly divergent blades 38a so as to pull in soil and fill and level the wheel track.

In operation, turning the barrel member 67 in one direction or the other serves to extend or retract the two link members 51 and 58 to thus adjust the effective length of the connector 32. For securing the turnbuckle barrel member 67 against undesirable or accidental rotation, a lug 77 is formed on the front end of the barrel member 67 and cooperates with a spring locking pin 78 that is insertible into an opening 79 formed in the rear portion 59 of the forward link member 58. When the spring locking pin 78 is in place, the turnbuckle barrel member 67 is held against rotation. However, when it is desired to adjust the amount of down pressure to be exerted on the coverers 37, the locking pin 78 is removed and the turnbuckle barrel member 67 rotated in one direction or the other to effect the desired adjustment.

While I have shown and described above the preferred structure in which the principles of this invention have been incorporated, it is to be understood that my invention is not to be limited to the physical details, shown and described above, but that, in fact widely different means may be employed in the practice of the broader aspects of my invention.

What I claim, therefore, and desire to secure by Letters Patent is:

1. In a grain drill, the combination with a frame, a footboard, rearwardly extending footboard supports fixedly connected at their forward ends with said frame, and a rockable shaft carried by said frame forward of the rear portions of said footboard supports, of a rockshaft, means rockably supporting said rockshaft on said footboard supports, generally fore-and-aft extending arms fixed at their forward ends to said rockshaft, ground-leveling blades pivoted to the rear ends of said arms, and an actuating connection between said rockshaft and said rockable shaft whereby operation of the latter acts through said rockshaft and arms to raise and lower said leveling blades.

2. In a grain drill, the combination with a frame, a footboard, rearwardly extending footboard supports fixedly connected at their forward ends with said frame, and a rockable shaft carried by said frame forward of the rear portions of said footboard supports, of a leveling attachment comprising depending brackets fixed to said footboard supports, the lower portions of said brackets being apertured, a rockshaft carried in the apertured portions of said brackets, generally rearwardly extending arms fixed at their forward ends to said rockshaft, ground-leveling blades pivoted to the rear ends of said arms, and an actuating connection between said rockable shaft and said rockshaft whereby said blades are caused to be raised out of ground-engaging position by operation of said rockable shaft, and stop means carried by each of said blades and engageable with the associated arm for limiting the movement of said blades relative to said arms.

3. In a grain drill or the like, frame means, ground wheels at the ends of said frame means supporting the latter, furrow openers, means connecting said furrow openers with said frame means, hoppers carried by the frame means, a footboard, generally rearwardly extending brackets fixed to said frame means and carrying said footboard rearwardly of the said hoppers, a rockshaft carried by said brackets and extending laterally outwardly thereof to points substantially directly behind said ground wheels, arms fixed in laterally spaced apart relation on said rockshaft, there being an arm fixed to the outer ends of said rockshaft behind the associated ground wheel, and ground leveling means connected to the rear end of each of said arms.

4. The invention set forth in claim 3, further characterized by wheel track filling means connected with the laterally outermost leveling means.

5. In a grain drill or the like, main frame means, furrow openers, drag bars swingably connecting said furrow openers with said main frame means, a first rockshaft carried by said frame means and connected with said furrow openers, said rockshaft being movable generally through a predetermined distance for raising and lowering said furrow openers, a second rockshaft carried by said frame means generally rearwardly of said furrow openers, an arm on each of said rockshafts, ground leveling means disposed behind said furrow openers and connected to be raised and lowered by said second rockshaft, and means adjustable in length connecting said arms for raising and lowering said ground leveling means varying distances in response to raising and lowering of said furrow openers, said adjustable connecting means including separate sections pivotally connected at their outer ends, respectively, with said arms, and turnbuckle means interconnecting the inner ends of said sections, the inner end of one of said sections being threaded, the adjacent inner end of the other section having a pin-receiving opening, and said turnbuckle means including a turnbuckle barrel having one end threaded and receiving the threaded end of said one section, the other end portion of said turnbuckle barrel including an interior groove and opening means leading thereto, and a pin insertable through said opening means and into said pin-receiving opening in said other section a distance such that the ends of said pin are movable in said interior groove, whereby said pin serves as means rotatably connecting said turnbuckle barrel with said other section.

References Cited by the Examiner

UNITED STATES PATENTS

| | | | |
|---|---|---|---|
| 323,953 | 8/85 | Outram | 111—85 |
| 593,355 | 11/97 | Harris | 287—60 |
| 964,761 | 7/10 | Davis | 111—61 |

(Other references on following page)

UNITED STATES PATENTS

| | | | |
|---|---|---|---|
| 1,082,072 | 12/13 | Davis | 111—85 X |
| 1,172,946 | 2/16 | Cooksey | 172—143 |
| 1,281,325 | 10/18 | Fetzer. | |
| 1,437,110 | 11/22 | Kettring | 172—155 |
| 1,695,512 | 12/28 | Sturrock | 172—138 |
| 1,960,268 | 5/34 | Kriegbaum et al. | 172—298 |
| 2,178,469 | 10/39 | Burke | 172—143 |
| 2,224,051 | 12/40 | Ihde | 172—138 |
| 2,224,800 | 12/40 | Seright | 172—155 |
| 2,277,880 | 3/42 | Noble | 172—138 |
| 2,722,878 | 11/55 | Neel | 172—155 |
| 2,771,044 | 11/56 | Putifer | 111—85 |
| 3,083,652 | 4/63 | Brettrager | 111—8 |

FOREIGN PATENTS 54,912   8/12   Austria.

ANTONIO F. GUIDA, *Acting Primary Examiner.*
T. GRAHAM CRAVER, WILLIAM A. SMITH III,
*Examiners.*